Figure 1:
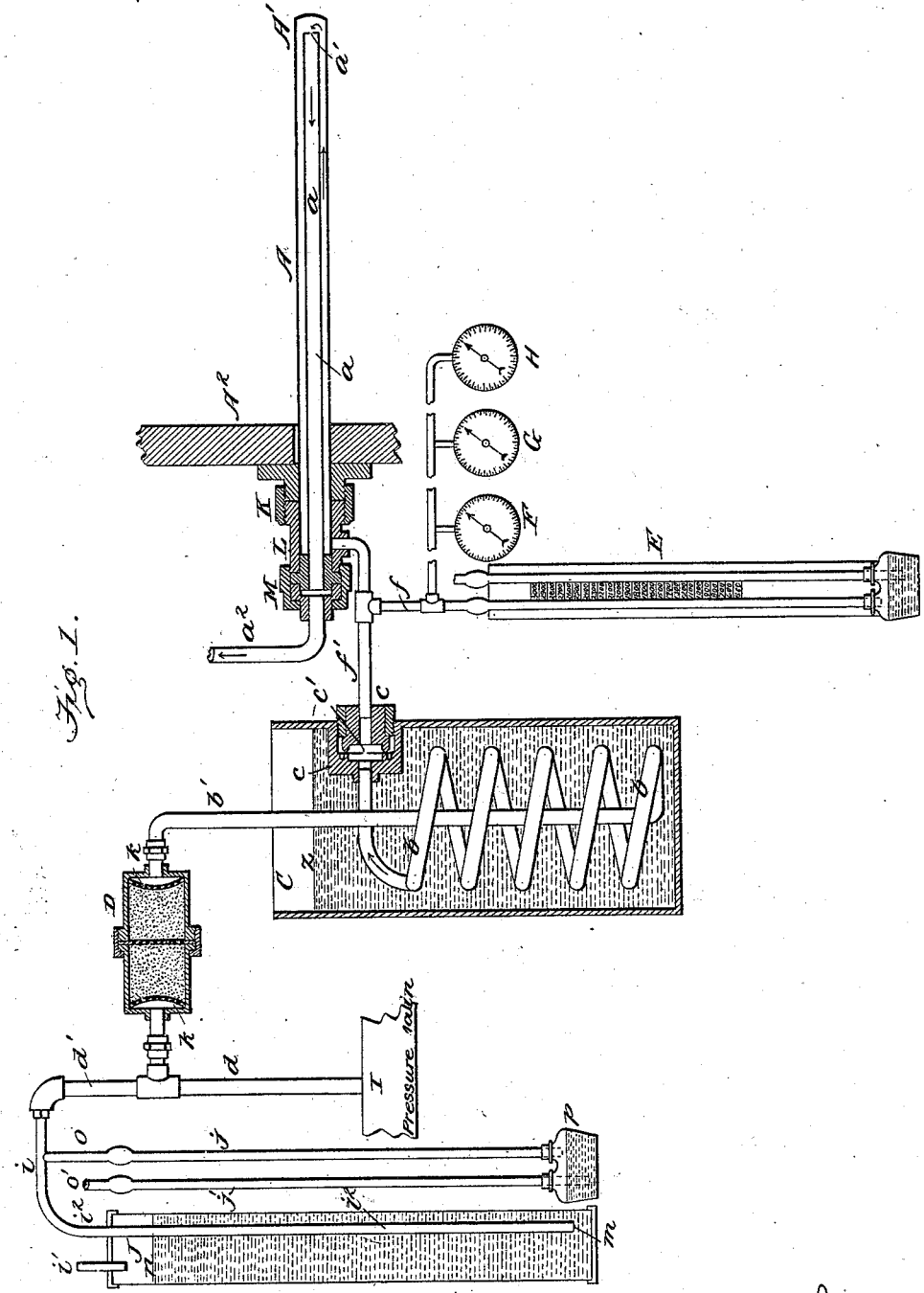

(No Model.) 2 Sheets—Sheet 1.

E. A. UEHLING & A. STEINBART.
PYROMETER.

No. 554,323. Patented Feb. 11, 1896.

WITNESSES:
Edwin L. Bradford

INVENTORS
Edward A. Uehling
Alfred Steinbart
By Johnson & Johnson
ATTORNEYS

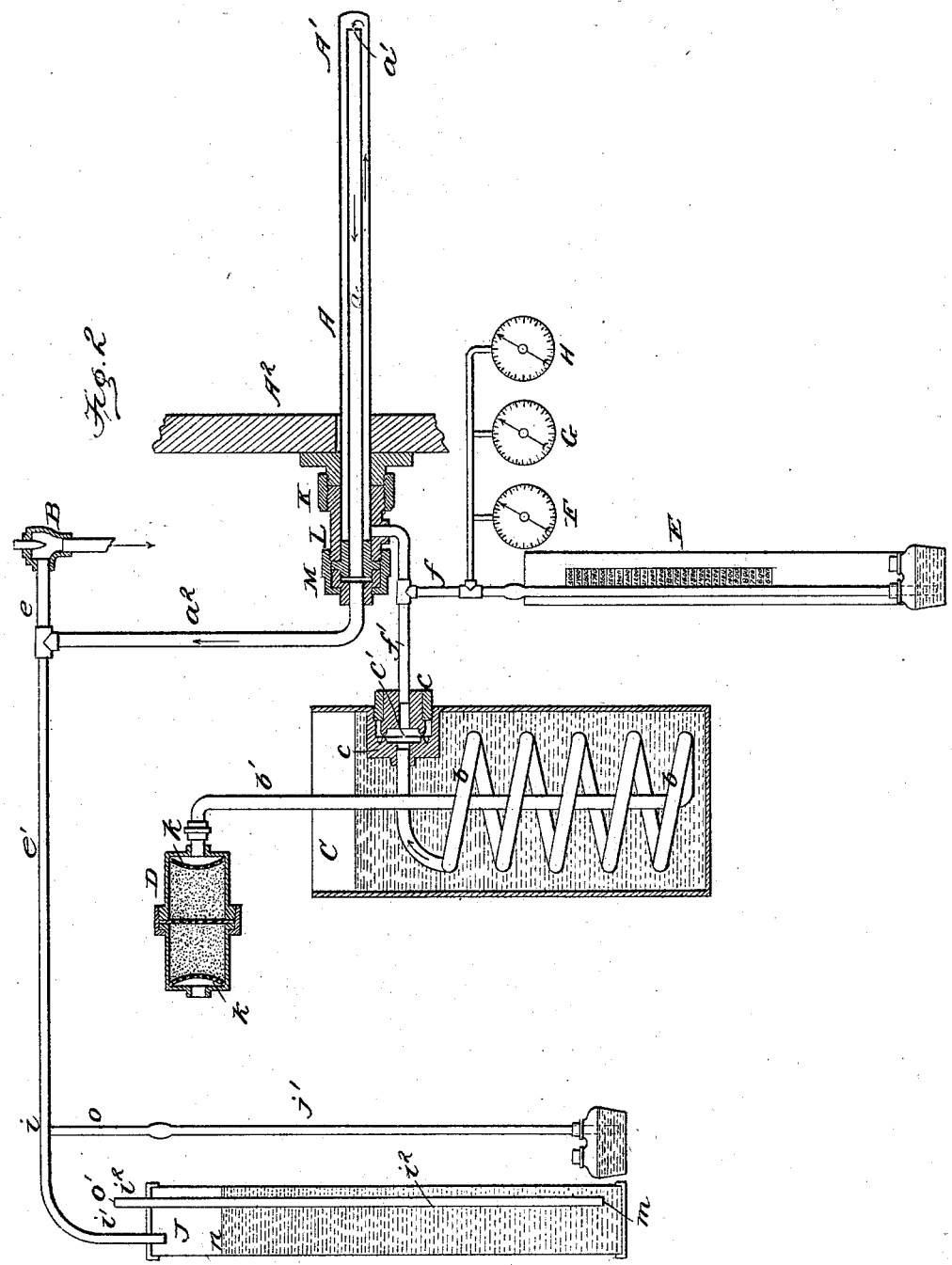

UNITED STATES PATENT OFFICE.

EDWARD A. UEHLING AND ALFRED STEINBART, OF BIRMINGHAM, ALABAMA.

PYROMETER.

SPECIFICATION forming part of Letters Patent No. 554,323, dated February 11, 1896.

Application filed April 18, 1894. Serial No. 507,996. (No model.)

*To all whom it may concern:*

Be it known that we, EDWARD A. UEHLING, a citizen of the United States, and ALFRED STEINBART, a native of Germany, (having declared in due form of law his intention of becoming a citizen of the United States and received official papers from the German government stating that he is no longer a subject of the Emperor of Germany,) both residents of Birmingham, in the county of Jefferson and State of Alabama, have invented certain new and useful Improvements in Pyrometers, of which the following is a specification.

Our present invention involves the same general principle of operation in measuring temperature as set out in a patent granted to us August 15, 1893, No. 503,337, and reissued April 17, 1894, No. 11,413; and the improvements which form the subject of this patent consists in certain novel methods and apparatus particularly pointed out in the claims concluding this specification.

The accompanying drawings illustrate an apparatus for determining temperature, adapted for carrying out our present invention, the parts being shown in Figure 1 in sectional elevation in their relation to each other and to the chamber, the temperature of which is to be determined and as constructed for working under pressure. Fig. 2 is a like illustration of the apparatus as constructed for working under suction.

The construction of this apparatus while being well suited for carrying out the invention herein claimed is only intended as one form, and it is obvious that its construction may be varied to adapt it for use any where and with metallurgical or other operations in which it is important to ascertain and indicate temperature—such as a furnace, the molten metal, or air-blast.

A represents a tube whose closed end $A'$ is located at the point the temperature of which is to be determined, the wall $A^2$ showing a part of a furnace, hot-air main or heated chamber or closure. Within this tube is a smaller tube $a$, which extends to the inner end $A'$ of the outer tube and is provided at such end with an aperture $a'$, which communicates with an air-space formed by said outer tube. The inner tube $a$ extends through the other end of the outer tube and has an external branch pipe $a^2$, while connecting the outer tube at a point external to said air-blast chamber is a tube $f'$, which passes through a coupling $c$ and is formed into a coil $b$, which is placed within a vessel C for containing a liquid or other medium of constant temperature intended to immerse the coil. The coupling $c$ is located within this vessel, and the tube $f'$ joins the coiled tube $b$ within said coupling, which, for extreme accuracy, is also immersed in the liquid, the level of which is indicated at $z$. Within this coupling, at the junction of the pipes $f'$ and $b$, is placed a diaphragm provided with an aperture $c'$, similar to the aperture $a'$ in the end of the pipe $a$, so that these two successive apertures communicate with each other through the annular air-space of the tube A and the connecting-tube $f'$. Referring to Fig. 1, in which the instrument is represented as working under pressure, the coiled tube part is prolonged outside of the vessel by the pipe $b'$, which terminates in a filter D, which connects with the branch pipes $d$ and $d'$, while the branch pipe $a^2$ terminates in the atmosphere.

A branch pipe $f$ connects with the tube $f'$ and forms a communication with the space within the tubes A and $f'$ between the apertures. This branch pipe $f$ is the connection for properly-graduated manometers for indicating temperature, as at E F G H, which may be located respectively at any desired point any reasonable distance apart.

Referring to Fig. 1, in which the pyrometer is arranged to work under a tension greater than that of the atmosphere—that is, by pressure—the filter is connected by the pipe $d$ with the pressure-main I and by the pipe $d'$ $i$ $i^2$ with the pressure-regulator J and by the pipe $o$ $j'$ also with the manometer $j$, which dips under the surface of the liquid contained in the vessel $p$ and is open to the atmosphere at $o'$. The regulator J is filled with water to the level $n$, and the space above $n$ communicates with the atmosphere through the pipe $i'$. The tube $i^2$ dips into the water to a depth—forty-eight inches, for example—depending on the pressure under which the apparatus is to be operated.

Referring to Fig. 2, in which the instrument is arranged to work under a tension less than that of the atmosphere—that is, by suction—the pipe $a^2$ is connected by the pipe $e$ with the aspirator B and by the pipe $e'\, i\, i'$ with the airspace of the regulator J. The water-level is maintained at $n$, as in Fig. 1, and the pipe $i^2$ dips under the water forty-eight inches, more or less, as may be desired, as already stated; but is open to the atmosphere at its upper end.

While we have shown the two apertures as being in separate tubes, yet being in direct communication with each other and with the suction or with the pressure connections, as the case may be, they are practically in one and the same tube or chamber. That part of this tube which has the aperture $a'$ is inclosed by the tube A, so as to form a heat-conducting space between them, the inclosing tube for this purpose being made of any suitable heat-conducting material, preferably platinum, and located within the space or closure or connected with the device the temperature of which is to be determined. The corresponding aperture $c'$ is located within the vessel which contains the coil and the medium of normal or constant temperature, whereby the fluid is maintained at a constant temperature.

Although the most simple and most efficient manner of construction is as shown, it is obvious that changes in the form, proportions, and manner of details of construction, as are embraced in the terms of the claims, may be resorted to without departing from the principle or sacrificing any of the advantages of this invention.

The filter, which is very important for accurate work, preferably consists of a chamber D, filled with some permeable material, such as mineral wool or raw cotton. At the inlet or outlet of this chamber is a perforated diaphragm $k\, k$, which serves to give free passage of the fluid into and from the chamber and prevents the filtering material being driven into the connecting-pipe.

The filter-chamber is preferably made in two sections to permit of separating for the purpose of renovating the filtering material. Provision is also made for inspecting the tubes which are located in the medium the temperature of which is to be measured. For this purpose the inclosing tube A extends outside of the heat-containing chamber and is secured in position by a coupling K, which is preferably constructed with right and left screw-threads to make a close joining and render the parts separable. A separate tubular coupling-section L connects the coupling K with a second coupling M, which is constructed with a knife-edge union adapted to clamp and secure the outer end of the tube $a$ in position concentric with the inclosing tube and in continuous relation to the pipe $a^2$, so that these parts are also rendered separable. This coupling, by unscrewing the part K, allows the inclosing tube A to be withdrawn for inspection, while the coupling part M permits the release and withdrawal of the tube $a$ for inspection.

The separate tubular coupling L, while providing a convenient construction for securing and inspecting the tubes A $a$, serves also as the means for connecting the tube $f'$ with the air-space surrounding the tube $a$ and thereby connects the two apertures.

For working the pyrometer under pressure (see Fig. 1) the pipe $i$ is connected with a pipe $i^2$, which depends within the liquid, while a short pipe $i'$ in the upper end of the regulator is open to the atmosphere above the liquid. As the pipe $i^2$ is immersed in the liquid contained in the regulator, as soon as the acting pressure is equal to the column of water $m\, n$ the excess of air escapes at the bottom of the tube $i^2$ and bubbles up through the water and out to the atmosphere through the tube $i'$, preventing any further increase of pressure. This pressure is indicated by the manometer $j'$, and in which case the pipe $i$ is connected by the branch pipe $o$ to the pipe $j$, as shown. The air or gas under a constant pressure will now pass through the filter, which retains all solid impurities, and the coil $b$, entering the aperture $c'$ perfectly pure and at a constant temperature attained in passing through a coil enveloped by the temperature-regulating medium. In its course through the inclosing tube A A' the air or gas assumes the temperature to be measured and enters at such temperature the aperature $a'$, and flowing through the inclosed tube $a$ passes out to the atmosphere through the branch pipe $a^2$, thereby causing a tension in the space between the apertures—that is, in the form illustrated—the area of the tube $f$ and the annular space between the tubes A and $a$, which tension is a true measure of the difference of temperature at which the air passes through the respective apertures. The temperature at $c$ remaining constant, the tension or change of tension necessarily depends entirely on the temperature or change of temperature at A' $a'$, located at the point the degree of heat of which is to be measured, and is therefore a correct measure thereof, and is indicated by suitable graduated manometers, as at E or at F, G or H, as many of which can be used as may be necessary or desirable and which can be located at points near by or at any distance, as may be most convenient.

When the pyrometer is operated by suction it is arranged as shown in Fig. 2. The pressure-pipe I and the connections $d$ and $d'$ with the filter and pipe $i$ respectively disappear, leaving the filter open to the atmosphere at $k$. An aspirator B is connected with the pipes $a^2$ and $i$ by the pipe $e\, e'$. In consequence of the sucking action of the aspirator B a partial vacuum is created in $a^2$, causing a current through the apparatus of atmospheric air entering the filter at $k$. Hence the operation is identical with that produced by pressure, with this difference, that, under pressure, the tension at the connections $f$ and $i$ are above atmospheric pressure, while under suction the tension is below atmospheric pressure at these points. In this case the pipe $i$ is connected with the regulator-pipe $i'$, the branch pipe $o$ is connected with the pipe $j'$ and the pipe $i^2$ is left open to the atmosphere. In consequence of this the excess of suction is supplied through the pipe $i^2$ by bubbling up through the water column $m\ n$, and the amount of suction is indicated by the water rising in the pipe $j'$ equal to the suction applied. In either case the water column in the pipe $j'$ will be on a level with the level $n$ of the water in the regulator. In first passing the fluid under a normal temperature and constant tension through the inlet-aperture gives the advantage of requiring less change of temperature to be regulated in the device C, because in this method the measuring medium enters the device at atmospheric temperature, whereas in our previous invention the fluid enters at a much higher temperature and is not so readily adjusted.

The placing of one of the apertures, either the inlet or the outlet, in a submerged position within the medium of constant temperature gives greater accuracy to the device than it would have if this aperture were placed outside said medium, because the temperature of the fluid passing through it is thereby more accurately regulated at the instant of passage and the aperture itself is placed beyond the influence of changes.

In practice it will be found of great importance to be able to read the temperature, which it is desired to know at more than one point, and for this purpose we provide a construction which will admit of indicating the temperature at as many points as may be necessary or desirable.

While our invention is styled a "pyrometer," and in fact is such, yet our invention is equally applicable to measuring temperatures of the lowest possible degree of heat obtainable in the arts.

It will be understood that the device C may contain water at freezing or at boiling temperature and suitable provision may be made for maintaining such normal temperature.

We claim as our improvement—

1. The method of determining temperature which consists in bringing the fluid to a determined constant temperature; then passing it into a tube or chamber through an aperture; then bringing said fluid to the temperature to be ascertained during its passage through said tube or chamber then passing the fluid through another aperture and utilizing the tension of the fluid between said apertures as a means to indicate the temperature to be determined.

2. A temperature-measuring apparatus consisting of a tube or chamber having an inlet-aperture through which a fluid is passed at a constant temperature, combined with a temperature-regulating device to bring the fluid to said constant temperature before entering the said inlet-aperture and an aperture through which the fluid is passed after being raised to the temperature to be ascertained, the tension of the fluid between said apertures being used as a means to indicate the temperature to be determined.

3. A temperature-measuring apparatus consisting of a tube or chamber provided with a plurality of apertures through one of which the fluid passes at a temperature to be ascertained and through another of which it passes at a known temperature, the tension of the fluid between said apertures acting on one or more manometers indicating the temperature to be determined, in combination with a temperature-regulating device within which the said aperture through which the fluid passes at a determined temperature is located, and means for inducing a regular current through said apertures as specified.

4. In a temperature-measuring apparatus, the combination with a tube or chamber having a plurality of apertures through which the measuring fluid passes, at different temperatures, the tension of the fluid between said apertures being used as a means of indicating the temperature to be determined, a filter arranged to intercept impurities of the measuring fluid before entering either of said apertures and means for impelling the fluid through said apertures.

5. In a temperature-measuring apparatus consisting of a tube or chamber, having inlet and outlet apertures through which a measuring fluid passes and in which the tension between said apertures serves to indicate the temperature to be measured, the combination with the tube inclosing the tube $a\ a'$, the sleeve-coupling and the connecting-pipes $a^2$, $f'$ as described, and for the purpose set forth.

6. In a temperature-measuring apparatus, the combination, with a tube or chamber having a plurality of apertures through which the measuring fluid passes at different temperatures, a filter arranged to intercept impurities of the measuring fluid before entering either of said apertures, a temperature-regulating device arranged between said filter and the said tube and containing one of said apertures, means to indicate the temperature and means for inducing a regular current through said apertures.

In testimony whereof we have hereunto signed this specification.

EDWARD A. UEHLING.
ALFRED STEINBART.

Witnesses as to Edward A. Uehling:
  A. E. H. JOHNSON,
  A. R. JOHNSON.

Witnesses as to Alfred Steinbart:
  A. BOYER,
  A. W. SIMS.